(12) United States Patent
Ishihara et al.

(10) Patent No.: US 6,278,552 B1
(45) Date of Patent: Aug. 21, 2001

(54) POLARIZATION SEPARATION DEVICE AND PROJECTION-TYPE DISPLAY APPARATUS

(75) Inventors: Jun Ishihara, Kobe; Kohtaro Hayashi, Toyonaka, both of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/564,220

(22) Filed: May 3, 2000

(30) Foreign Application Priority Data

May 12, 1999 (JP) .................................. 11-131017
May 14, 1999 (JP) .................................. 11-133918

(51) Int. Cl.$^7$ .............................. G02B 27/10; G02B 5/18

(52) U.S. Cl. .......................................... 359/619; 359/569

(58) Field of Search .................. 359/619, 620, 359/621, 566, 569, 571

(56) References Cited

U.S. PATENT DOCUMENTS

| 5,687,153 | * | 11/1997 | Komma et al. ................. | 369/110 |
| 6,020,944 | * | 2/2000 | Hoshi ............................... | 349/62 |

FOREIGN PATENT DOCUMENTS

| 6-202094 | | 7/1994 | (JP) . | |
| 6-202094 (A) | | 7/1994 | (JP) . | |
| 10-197827 | | 7/1998 | (JP) . | |
| 10-197827 (A) | | 7/1998 | (JP) . | |
| 10-197827-A | * | 7/1998 | (JP) ............................ | G02B/27/28 |

OTHER PUBLICATIONS

J. Cheng and G. D. Boyd, "The liquid–crystal alignment properties of photolithographic gratings", *Appl. Phys. Lett.*, vol. 35, No. 6, Sep. 15, 1979, pp. 444–446.

D.C. Flanders, D.C. Shaver, and Henry I. Smith, "Alignment of liquid crystals using submicrometer periodicity gratings", *Appl. Phys. Lett.*, vol. 32, No. 10, May 15, 1978, pp. 597–598.

Akihiko Sugmura, Nobuyuki Yamamoto, and Takao Kawamura, "High Surface Ordering of Nematic Liquid Crystal Using Periodicity Grating", *Jpn. J. Appl. Phys.*, vol. 20 (1981), No. 7, pp. 1343–1344.

H.V. Känel, J.D. Litster, J. Melngailis, and H.I. Smith, "Alignment of nematic butoxybenzilidene octylaniline by surface–relief gratings", *Phys. Rev. A*, vol. 24, No. 5, (1981), pp. 2713–2719.

* cited by examiner

*Primary Examiner*—Ricky Mack
(74) *Attorney, Agent, or Firm*—Sidley Austin Brown & Wood

(57) ABSTRACT

A polarization separation device has a grating having a recurring blaze-shaped grating pattern formed on one surface of a transparent base plate and an optically anisotropic material layer arranged adjacent to the grating and having different refractive indices in the direction in which the grating pattern recurs and in the direction perpendicular to that direction. The polarization separation device separates light incident thereon into two linearly polarized light components that have polarization planes perpendicular to each other in accordance with the polarization directions thereof by refracting one and simply transmitting the other of those two linearly polarized light components. Here, the refractive index N0 of the grating and the refractive indices Ne and Np of the optically anisotropic material layer with respect to one and the other, respectively, of the linearly polarized light components are defined as follows:

$$|Ne-N0| \geq 0.2,$$

and $$|Np-N0| \leq 0.03.$$

19 Claims, 13 Drawing Sheets

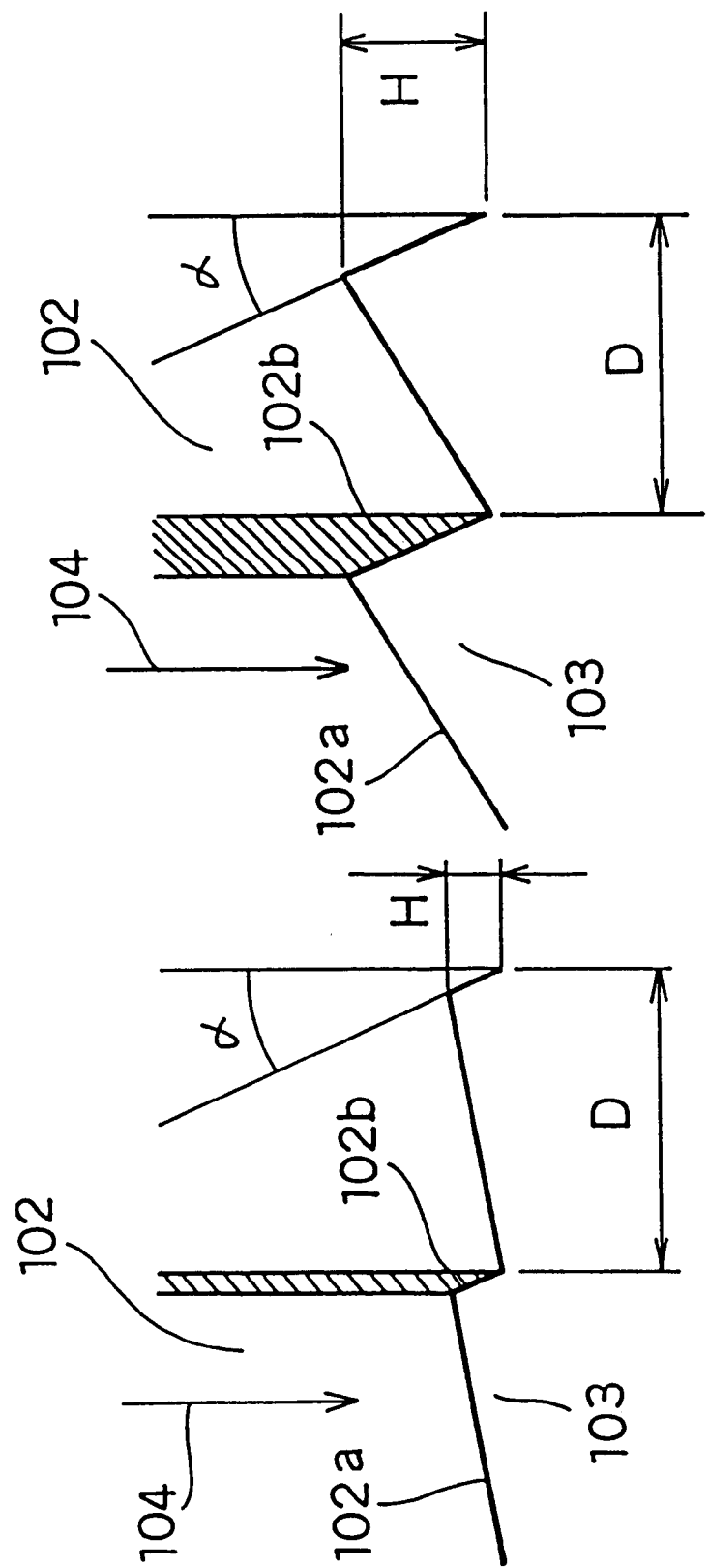

POLARIZATION SEPARATION DEVICE AND PROJECTION-TYPE DISPLAY APPARATUS

This application is based on applications Nos. H11-131017 and H11-133918 filed in Japan on May 12, 1999 and May 14, 1999 respectively, the entire content of which is hereby incorporated by reference.

BACKGROUND OF THE INVENTION

1. Field of the Invention

The present invention relates to a polarization separation device used to illuminate a spatial light modulation device such as a liquid crystal panel that utilizes polarization of light. The present invention relates also to a projection-type display apparatus having such a polarization separation device.

2. Description of the Prior Art

Conventionally, as projection-type display apparatuses that project an enlarged image of an original image through a projection lens are known those employing a CRT and those employing a light source and a spatial light modulation device. Here, as spatial light modulation devices are known transmission-type liquid crystal panels that use twisted nematic liquid crystal. Liquid crystal panels of this type are in practical use in various applications because they permit miniaturization of projection-type display apparatuses, because they permit projection of high-resolution images simply if provided with sufficient numbers of pixels, and because their mass-production methods have been well established with those manufactured for direct-view purposes.

A spatial light modulation device such as one using twisted nematic liquid crystal utilizes polarization of light, and therefore has polarizers provided at its entrance and exit sides. Out of the light that illuminates the spatial light modulation device, the linearly polarized light component that has passed through the entrance-side polarizer then has its polarization state modulated spatially while passing inside the spatial light modulation device. This controls the amount of light that passes through the exit-side polarizer, and thereby forms an optical image.

A projection-type display apparatus employing a spatial light modulation device typically uses a lamp that emits natural light to illuminate the spatial light modulation device. If the spatial light modulation device is of a type that utilizes polarization of light, the polarizer provided at its entrance side transmits only about one half of the natural light emitted from the lamp, and the other half of the light is wasted by being reflected or absorbed.

To overcome this inconvenience, various techniques have been proposed that are generally called polarization conversion. According to these techniques, the natural light from a light source is separated beforehand into, on the one hand, a polarized light component (hereafter referred to as the primary polarized light component) polarized in the same way as the light that a spatial light modulation device is designed to use and, on the other hand, a polarized light component (hereafter referred to as the secondary polarized light component) polarized perpendicularly thereto. Then, the polarization plane of the secondary polarized light component, which if left intact the spatial light modulation device cannot use, is rotated through 90° so that the primary and secondary polarized light components are, after their polarization planes are thus made identical, together fed to the spatial light modulation device. In this way, it is possible to use both of the two polarized light components.

Accordingly, a projection-type display apparatus utilizing polarization conversion needs to be provided with a polarization separation device for separating natural light into two polarized light components polarized in directions perpendicular to each other and a polarization plane rotating device for rotating the polarization plane of one of those two separated polarized light components through 90°. As polarization separation devices, polarization separation multilayer films are widely known that utilize the Brewster angle and interference and that are available in plate-shaped and prism-shaped types.

On the other hand, as polarization plane rotating devices, phase films called $\lambda/2$ plates are generally known. A $\lambda/2$ plate is made by drawing an optically transparent organic film uniaxially so as to give it optical anisotropy. It has its thickness and optical anisotropy so controlled as to give the light passing therethrough a phase difference that corresponds to one half of the wavelength of the light. Accordingly, if linearly polarized light having a polarization plane in a direction 45° with respect to an optical axis enters a $\lambda/2$ plate, it exits therefrom as linearly polarized light having a polarization plane rotated further through 90°.

A projection-type display apparatus having a polarization separation device and a polarization plane rotating device as described above is disclosed in Japanese Laid-Open Patent Application H6-202094. The construction of this projection-type display apparatus is shown in FIG. 14. The natural light radiated from a light source 901 is made into a parallel beam by a parabolic surface mirror 902, and then enters a polarization separation device 903. The primary and secondary polarized light components exiting from the polarization separation device 903 travel through a first and a second lens array 904 and 905, and then illuminate a liquid crystal panel 907.

The first lens array 904 separates the beam of the illumination light into partial beams, and the thus separated partial beams are enlarged by the second lens array 905 to an appropriate size. The separated partial beams are then superimposed on each other on the liquid crystal panel 907 by a convex lens 908. Another convex lens 909 provided in the vicinity of the liquid crystal panel 907 makes the principal ray within each angle of view parallel to the optical axis.

The polarization separation device 903 has a structure as shown in FIG. 15. A structure composed by putting together a prism having an isotropic refractive index and a prism layer made of a birefringent material in general is widely known as a Wollaston prism. This structure exhibits, at the interface between the prism and the prism layer, different refraction conditions in different polarization directions perpendicular to each other, and thereby permits two polarized light components to travel in different directions.

The polarization separation device 903 has a plurality of such Wollaston prisms arranged in an array. Thus, the polarization separation device 903 is composed of a prism array base plate 911 having a blaze-shaped section, a flat base plate 912, and a birefringent optical material layer 913 made of an optically anisotropic material. Here, since calcite, which is generally used as an optically anisotropic material, is expensive, a material produced by uniaxially arranging strips of an organic material such as liquid crystal layers, organic films, or monomers is used.

Thus, the polarization separation device 903 separates the light 914 entering it into a primary polarized light component 914a and a secondary polarized light component 914b that exit therefrom traveling in directions θ' degrees apart from each other. As a result, the light beams that the first lens array 904 makes converge on the second lens array 905 each form separate spots, a predetermined distance apart from each other in the direction of the angle θ', for the primary and secondary polarized light components 914a and 914b.

In the vicinity of the second lens array 905, a phase difference plate 906 is provided that selectively acts on the spots formed by the secondary polarized light component so as to rotate its polarization plane through 90°. As a result, the polarization planes of the primary and secondary polarized light components exiting from the convex lens 908 are made uniform. By aligning the polarization plane of these polarized light components with the polarization direction of the entrance-side polarizer (not shown) of the liquid crystal panel 907, it is possible to realize an optical system that permits efficient use of light.

The prism array base plate 911 used in this polarization separation device 903 utilizes diffraction of light, and thus has prisms arranged with a pitch P of about 1 mm. This requires a considerably thick birefringent optical material layer 913. However, it is generally difficult to form a thick birefringent optical material layer 913 by uniaxially arranging strips of an optically anisotropic material. For this reason, a polarization separation device in which a diffraction grating is used instead of a prism array base plate 911 is disclosed in Japanese Laid-Open Patent Application H10-197827.

This polarization separation device is shown in FIG. 16. The polarization separation device 101 is composed of a diffraction gating 102 having a blaze-shaped section and having a pitch D and a height H both of the order of several micrometers and a birefringent optical material layer 103 made of an optically anisotropic material. As an optically anisotropic material having birefringence, a material produced by uniaxially orienting acicular liquid crystal molecules is used.

According to known methods, orientation is achieved, for example, by forming an organic orientation film of polyimide or the like on a base plate and then rubbing the film with a rubbing cloth in one direction so as to form fine grooves (this method will hereafter be referred to as "rubbing"), or by vapor-depositing $SiO_2$ obliquely on a base plate so as to form fine grooves, or by ion-milling a base plate so as to form fine grooves (this method will hereafter be referred to as "grating"). All of these methods cause a force that tends to align the length direction of the liquid crystal molecules with the grooves, and thus the liquid crystal molecules are oriented uniaxially.

If the refractive index of the optically anisotropic material for a primary polarized light component is made substantially equal to the refractive index of the diffraction grating and the refractive index of the optically anisotropic material for a secondary polarized light component is made different from the refractive index of the diffraction grating, when the first and secondary polarized light components pass through the polarization separation device 101, the former is allowed to travel straight and the latter is diffracted. Thus, light 104 entering the polarization separation device 101 is separated into a primary polarized light component 104a and a secondary polarized light component 104b that exit therefrom traveling in directions apart from each other by the angle of diffraction θ. This helps make the birefringent optical material layer 103 thin and easy to produce.

However, in this polarization separation device 101 disclosed in H10-197827, as shown in FIG. 17, the diffraction grating 102 having a blaze-shaped section has both effective surfaces 102a that are involved in diffraction and non-effective surfaces 102b that has nothing to with diffraction.

The diffraction grating 102 is formed by molding using a metal mold. Therefore, to secure allowances for manufacturing errors in the metal mold and to secure drafts for easing the removal of the metal mold in the molding process, the non-effective surfaces 102b are formed at an angle α relative to the direction perpendicular to the entrance surface 101a of the polarization separation device 101. As a result, as indicated by hatching in the figure, part of the incident light 104 strikes the non-effective surfaces 102b, and this lowers the diffraction efficiency with which the light is diffracted in the desired direction.

Moreover, in cases where the liquid crystal molecules are oriented uniaxially by rubbing, since the diffraction grating 102 that serves as a base plate has a blaze-shaped section, the rubbing cloth does not reach to the bottom portions thereof. This makes satisfactory orientation of the liquid crystal molecules impossible. On the other hand, orientation by vapor-depositing of $SiO_2$ or by grating requires not only extra production steps but also expensive equipment such as a vapor-depositing, ion-milling, or other apparatus, and thus raises the manufacturing costs.

Moreover, a polarization conversion optical system requires the provision of a first and a second lens array 904 and 905 and a polarization separation device 903 or 101; that is, it requires a comparatively large number of components, and thus raises the costs of the projection-type display apparatus as a whole that incorporates it.

SUMMARY OF THE INVENTION

An object of the present invention is to provide a polarization separation device that offers better diffraction efficiency.

Another object of the present invention is to provide a polarization separation device that permits easy orientation of liquid crystal molecules on a diffraction grating and thereby permits reduction of manufacturing costs.

Still another object of the present invention is to provide a projection-type display apparatus that offers better diffraction efficiency and thus offers satisfactory brightness in displayed images.

A further object of the present invention is to provide a projection-type display apparatus that permits reduction of manufacturing costs.

To achieve the above object, according to one aspect of the present invention, a polarization separation device is provided with: a grating having a recurring blaze-shaped grating pattern formed on one surface of a transparent base plate; and an optically anisotropic material layer arranged adjacent to the grating and having different refractive indices in the direction in which the grating pattern recurs and in the direction perpendicular to that direction. Here, the polarization separation device separates the light incident thereon into two linearly polarized light components that have polarization planes perpendicular to each other in accordance with the polarization directions thereof by refracting one and simply transmitting the other of those two linearly polarized light components. Moreover, the following conditions are fulfilled:

$$|Ne-N0| \geq 0.2,$$

and $$|Np-N0| \leq 0.03,$$

where N0 represents the refractive index of the grating, Ne represents the refractive index of the optically anisotropic material layer with respect to one of the linearly polarized light components, and Np represents the refractive index of the optically anisotropic material layer with respect to the other of the linearly polarized light components.

According to another aspect of the present invention, a polarization separation device is provided with: a grating having a recurring blaze-shaped grating pattern formed on one surface of a transparent base plate; an optically anisotropic material layer arranged adjacent to the grating and having different refractive indices in the direction in which the grating pattern recurs and in the direction perpendicular to that direction; and a lens array layer having a plurality of lens surfaces and arranged on the entrance side or exit side of the polarization separation device. Here, the polarization separation device separates the light incident thereon into two linearly polarized light components that have polarization planes perpendicular to each other in accordance with the polarization directions thereof by refracting one and simply transmitting the other of those two linearly polarized light components.

According to another aspect of the present invention, a polarization separation device is provided with: a grating having a recurring blaze-shaped grating pattern formed on one surface of a transparent base plate; and an optically anisotropic material layer arranged adjacent to the grating and having different refractive indices in the direction in which the grating pattern recurs and in the direction perpendicular to that direction. Here, the polarization separation device separates the light incident thereon into two linearly polarized light components that have polarization planes perpendicular to each other in accordance with the polarization directions thereof by refracting one and simply transmitting the other of those two linearly polarized light components. Here, the grating has minute grooves formed on a surface thereof facing the optically anisotropic material layer along one of the two directions.

According to another aspect of the present invention, a projection-type display apparatus is provided with: a polarization separation device for separating the light incident thereon into two linearly polarized light components that have polarization planes perpendicular to each other in accordance with the polarization directions thereof by refracting one and simply transmitting the other of those two linearly polarized light components, having a grating having a recurring blaze-shaped grating pattern formed on one surface of a transparent base plate, and also having an optically anisotropic material layer arranged adjacent to the grating and having different refractive indices in the direction in which the grating pattern recurs and in the direction perpendicular to that direction; a light source for emitting light; a light condenser for condensing the light emitted from the light source so as to form it into a substantially parallel beam; a first lens array having a plurality of lenses; a second lens array having a plurality of lenses arranged one for each of the lenses of the first lens array in such a way that the two linearly polarized light components exiting from the polarization separation device are made to converge on two different lenses of the second lens array; a polarization plane rotator for rotating the polarization plane of one of the linearly polarized light components having passed through the second lens array so as to make it identical with the polarization plane of the other of the linearly polarized light components having passed through the second lens array; a spatial light modulation device for modulating the light having passed through the second lens array so as to form an optical image; and a projection optical system for projecting the optical image. Here, the following conditions are fulfilled:

$$|Ne-N0| \geq 0.2,$$

and $$|Np-N0| \leq 0.03,$$

where N0 represents the refractive index of the grating, Ne represents the refractive index of the optically anisotropic material layer with respect to one of the linearly polarized light components, and Np represents the refractive index of the optically anisotropic material layer with respect to the other of the linearly polarized light components.

According to another aspect of the present invention, a projection-type display apparatus is provide with: a polarization separation device for separating the light incident thereon into two linearly polarized light components that have polarization planes perpendicular to each other in accordance with the polarization directions thereof by refracting one and simply transmitting the other of those two linearly polarized light components, having a grating having a recurring blaze-shaped grating pattern formed on one surface of a transparent base plate, also having an optically anisotropic material layer arranged adjacent to the grating and having different refractive indices in the direction in which the grating pattern recurs and in the direction perpendicular to that direction, and also having a lens array layer having a plurality of lens surfaces and arranged on the entrance side or exit side of the polarization separation device; a light source for emitting light; a light condenser for condensing the light emitted from the light source so as to form it into a substantially parallel beam; a first lens array having a plurality of lenses; a second lens array having a plurality of lenses arranged one for each of the lenses of the first lens array in such a way that the two linearly polarized light components exiting from the polarization separation device are made to converge on two different lenses of the second lens array; a polarization plane rotator for rotating the polarization plane of one of the linearly polarized light components having passed through the second lens array so as to make it identical with the polarization plane of the other of the linearly polarized light components having passed through the second lens array; a spatial light modulation device for modulating the light having passed through the second lens array so as to form an optical image; and a projection optical system for projecting the optical image.

According to another aspect of the present invention, a projection-type display apparatus is provided with: a polarization separation device for separating the light incident thereon into two linearly polarized light components that have polarization planes perpendicular to each other in accordance with the polarization directions thereof by refracting one and simply transmitting the other of those two linearly polarized light components, having a grating having a recurring blaze-shaped grating pattern formed on one surface of a transparent base plate, and also having an optically anisotropic material layer arranged adjacent to the grating and having different refractive indices in the direction in which the grating pattern recurs and in the direction perpendicular to that direction, with minute grooves formed on the surface of the grating facing the optically anisotropic material layer along one of the two directions; a light source for emitting light; a light condenser for condensing the light emitted from the light source so as to form it into a substantially parallel beam; a first lens array having a plurality of lenses; a second lens array having a plurality of lenses arranged one for each of the lenses of the first lens array in such a way that the two linearly polarized light components exiting from the polarization separation device are made to converge on two different lenses of the second lens array; a polarization plane rotator for rotating the polarization plane of one of the linearly polarized light components having passed through the second lens array so as to make it identical with the polarization plane of the other of the linearly polarized light components having passed through the second lens array; a spatial light modulation device for modulating the light having passed through the second lens array so as to form an optical image; and a projection optical system for projecting the optical image.

BRIEF DESCRIPTION OF THE DRAWINGS

This and other objects and features of this invention will become clear from the following description, taken in conjunction with the preferred embodiments with reference to the accompanied drawings in which:

FIGS. 8 and 9 are diagrams illustrating how the maximum height of the diffraction grating causes the lowering of diffraction efficiency;

DESCRIPTION OF THE PREFERRED EMBODIMENTS

Figure 1:
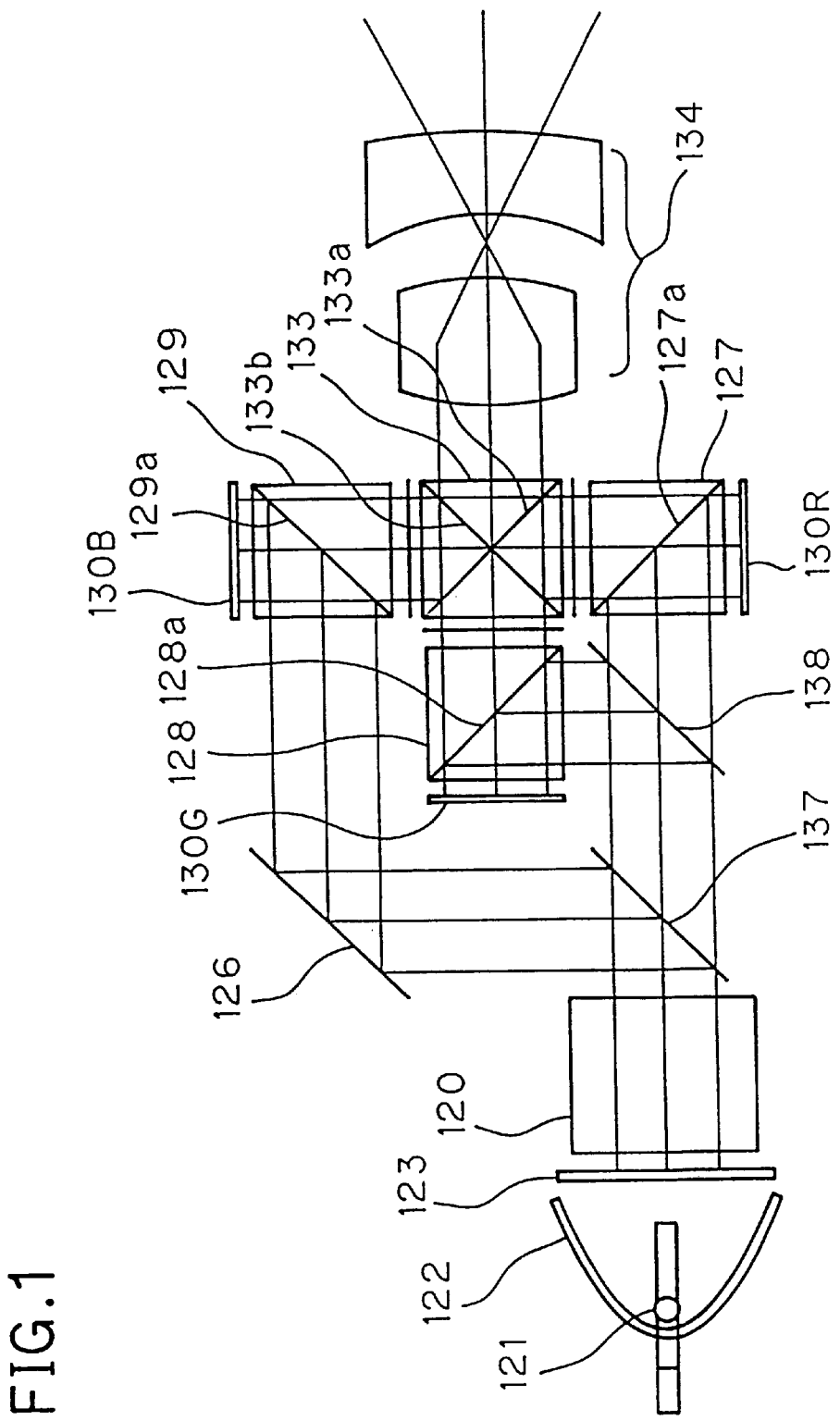
FIG. 1 is a diagram showing the construction of the projection-type display apparatus of a first embodiment of the present invention.

The projection-type display apparatus of a first embodiment of the present invention will be described below with reference to FIG. 1. This projection-type display apparatus is composed of a light source 121, a parabolic surface mirror 122, a UV/IR cut filter 123, a polarization conversion optical system 120, dichroic mirrors 137 and 138, a reflecting mirror 126, reflection-type liquid crystal panels 130R, 130G, and 130B (spatial light modulation devices), PBS prisms 127, 128, and 129, a cross dichroic prism 133, and a projection optical system 134.

The light emitted from the light source 121 is formed into a parallel beam by the parabolic surface mirror 122. This parallel beam is then passed through the UV/IR cut filter 123 so that ultraviolet and infrared components are removed therefrom. Then, the light beam is passed through the polarization conversion optical system so as to be converted into linearly polarized light polarized in a predetermined direction.

Out of the linearly polarized light exiting from the polarization conversion optical system 120, only the blue light component is reflected from the dichroic mirror 137, and the red and green light components are transmitted therethrough. The blue light component is then reflected from the reflecting mirror 126, is then reflected from the reflecting surface 129a of the PBS prism 129 that reflects only light polarized in the predetermined direction mentioned above, and then illuminates the reflection-type liquid crystal panel 130B. The reflection-type liquid crystal panel 130B reflects predetermined portions of the blue light component, and meanwhile rotates its polarization plane through 90°.

The blue light component exiting from the reflection-type liquid crystal panel 130B has a polarization plane perpendicular to the predetermined direction mentioned above, and is therefore transmitted through the reflecting surface 129a of the PBS prism 129. The blue light component is then reflected from the first reflecting surface 133a of the cross dichroic prism 133 that reflects only blue light, and is then projected through the projection optical system 134.

The red and green light components transmitted through the dichroic mirror 137 is directed to the dichroic mirror 138, which reflects only green light and transmits red light. The green light component is then reflected from the reflecting surface 128a of the PBS prism 128 that reflects only linearly polarized light polarized in the predetermined direction mentioned above, and then illuminates the reflection-type liquid crystal panel 130G. The reflection-type liquid crystal panel 130G reflects predetermined portions of the green light component, and meanwhile rotates its polarization plane through 90°.

The green light component exiting from the reflection-type liquid crystal panel 130G has a polarization direction perpendicular to the predetermined direction mentioned above, and is therefore transmitted through the reflecting surface 128a of the PBS prism 128. The green light component is then transmitted through the first reflecting surface 133a of the cross dichroic prism 133 and then through the second reflecting surface 133b thereof that transmits only red light, and is then projected through the projection optical system 134.

The red light component transmitted through the dichroic mirror 138 is reflected from the reflecting surface 127a of the PBS prism 127 that reflects only linearly polarized light polarized in the predetermined direction mentioned above, and then illuminates the reflection-type liquid crystal panel 130R. The reflection-type liquid crystal panel 130R reflects predetermined portions of the red light component, and meanwhile rotates its polarization plane through 90°.

The red light component exiting from the reflection-type liquid crystal panel 130R has a polarization direction perpendicular to the predetermined direction mentioned above, and is therefore transmitted through the reflecting surface 127a of the PBS prism 127. The red light component is then reflected from the second reflecting surface 133b of the cross dichroic prism 133, and is then projected through the projection optical system 134. In this way, the red, green, and blue light components are integrated together and projected onto a screen (not shown).

Figure 2:
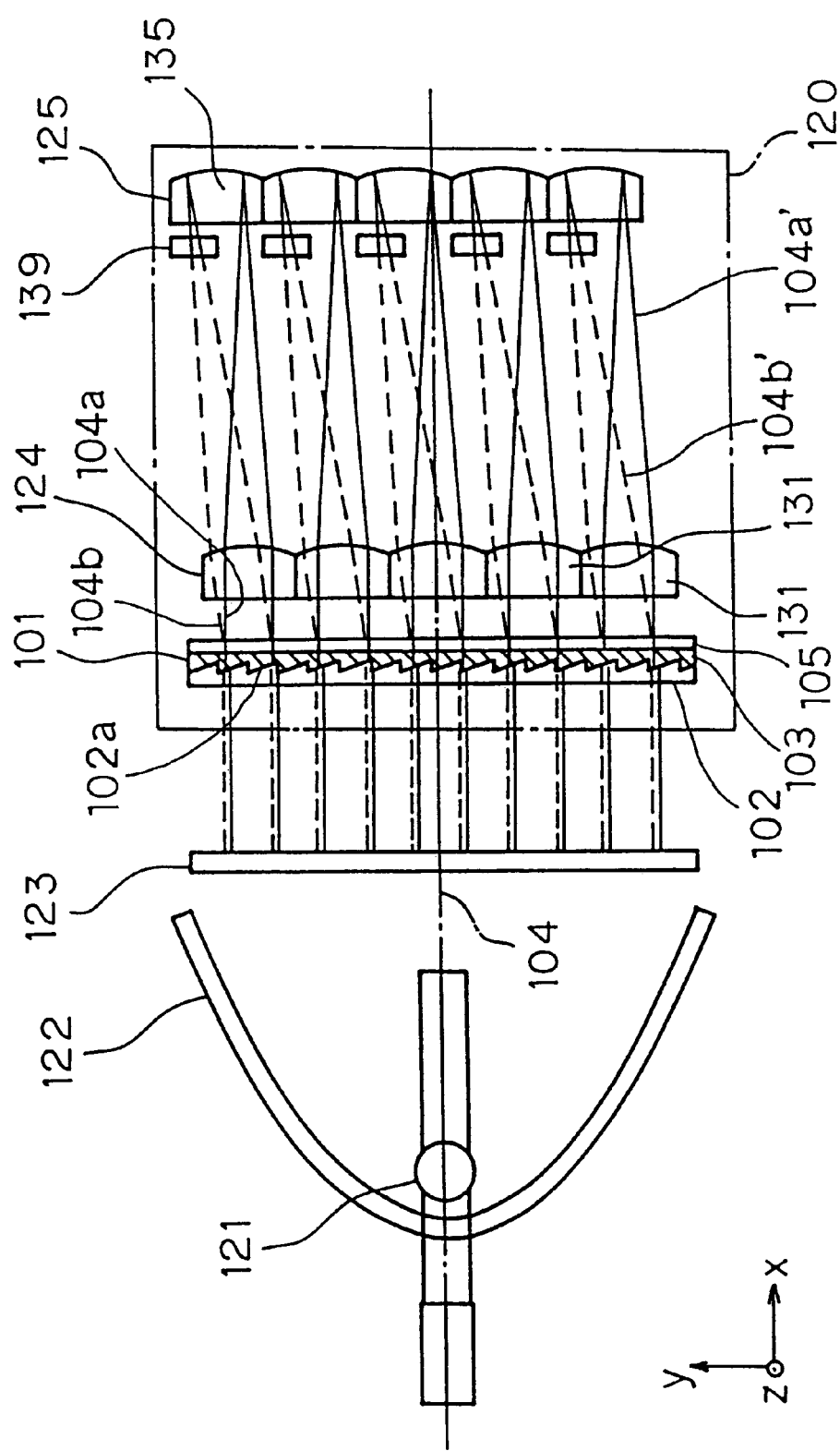
FIG. 2 is a diagram showing the construction of the polarization conversion optical system of the projection-type display apparatus of the first embodiment.

As shown in FIG. 2, the polarization conversion optical system 120 has a polarization separation device 101, a first lens array 124, and a second lens array 125. The second lens array 125 has phase difference plates 139 (a polarization plane rotator) attached thereto so as to partially cover one surface thereof. For simplicity's sake, in the following descriptions, the direction of the optical axis that runs along the axis of symmetry of the parabolic surface mirror 122 is called the x axis, the direction perpendicular to the plane of the figure is called the z axis, and the direction perpendicular to both the x and z axes is called the y axis.

Figure 18:
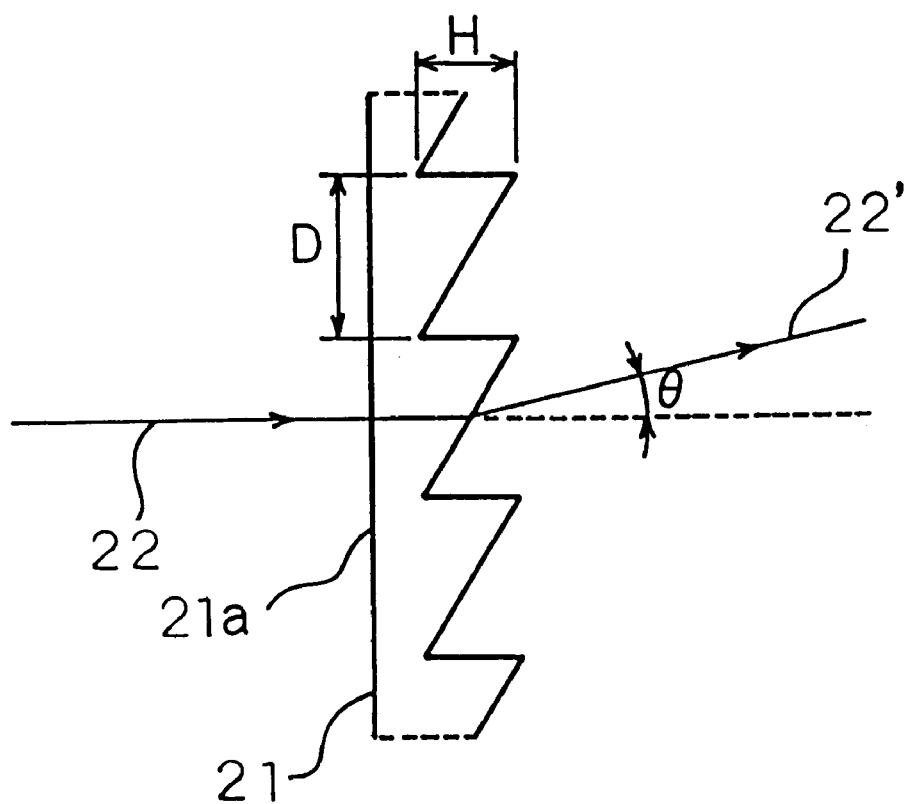
FIG. 18 is a diagram illustrating the principle of a diffraction grating.

Now, the principle of a diffraction grating will be described briefly. FIG. 18 shows a diffraction grating 21 having a recurring pattern of a microstructure having a blaze-shaped section formed on the surface thereof. Here, assume that the blaze shape has a pitch D and a maximum height H. The maximum height H is so determined that light 22 incident on the entrance-side surface 21a of the diffraction grating 21 from the direction of a normal thereto and having a wavelength $\lambda$ is given a phase difference of $2\pi$. Thus, almost all of the incident light 22 is, as diffracted light of order +1, refracted by an angle of diffraction of $\theta$ to become exiting light 22'.

In this case, the maximum height H and the angle of diffraction $\theta$ are given $$H=\lambda/(Ns-Na) \quad (1)$$

$$\sin\theta=\lambda/D \quad (2)$$

where Ns represents the refractive index of the diffraction grating 21, and Na represents the refractive index of the medium surrounding the diffraction grating 21.

Figure 3:
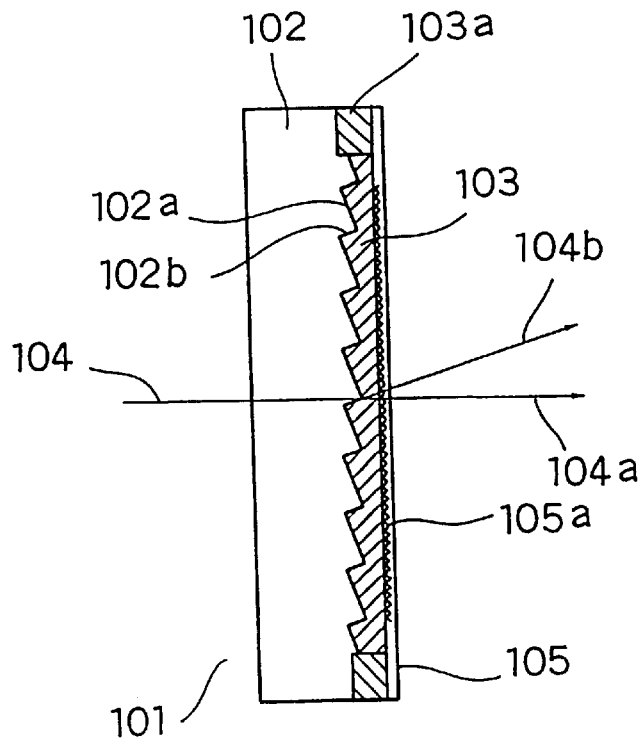
FIG. 3 is a diagram showing an example of the polarization separation device of the projection-type display apparatus of the first embodiment.

A detail view of the polarization separation device 101 used in this embodiment is shown in FIG. 3. As shown in this figure, the polarization separation device 101 is composed of a birefringent optical material layer 103 (an optically anisotropic material layer) sandwiched between a diffraction grating 102 and a counter flat plate 105. Here, assume that, of naturally polarized light 104 incident on the polarization separation device 101 along the x axis, the polarized light component (the primary polarized light component 104a) polarized in the same way as the light that the reflection-type liquid crystal panels are designed to use is a polarized light component that vibrates in the y-axis direction, and the secondary polarized light component 104b is a polarized light component that vibrates in the z-axis direction.

The diffraction grating 102 has effective surfaces 102a, which are involved in the diffraction of the incident light 104, and non-effective surfaces 102b, which have nothing to do therewith, arranged in a pattern having a blaze-shaped section that recurs in the y-axis direction. The diffraction grating 102 is produced by resin molding so as to allow easy formation of a complex blaze shape.

Figure 19:
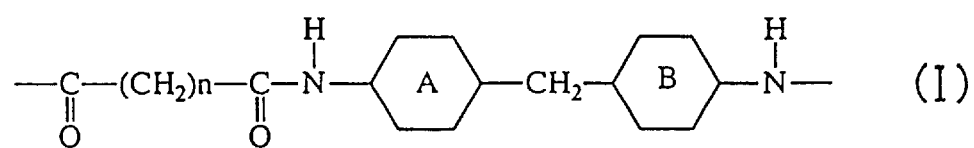
FIGS. 19 and 20 are chemical formulae of the material of the diffraction gratings of the first and second embodiments.
Figure 20:
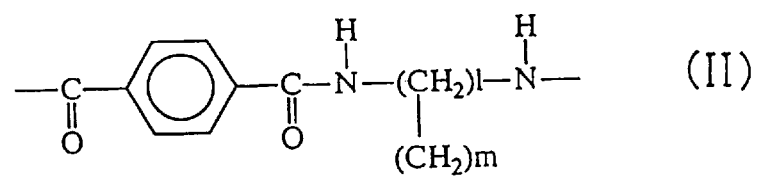

As the material of the resin here, it is preferable to use a polyamide resin such as those having chemical formulae (I) and (II) as shown in FIGS. 19 and 20 because they are resistant to dissolution in nematic liquid crystal and are thus reliable. In the chemical formula (I) shown in FIG. 19, the symbol n represents an integer number from 2 to 6, and the symbols A and B represent a 1,4-phenylele group or a 1,4-cyclohexyl group. In the chemical formula (II) shown in FIG. 20, the symbols l and m represent integer numbers from 1 to 15 that fulfill l+m<16.

The birefringent optical material layer 103 is made of an optically anisotropic material such as nematic liquid crystal. The optically anisotropic material, such as liquid crystal, has acicular molecules, which are arranged with their length direction aligned with the z axis so as to exhibit a positive uniaxiality. Around the birefringent optical material layer 103 is applied a sealing of a ultraviolet-curing or thermosetting resin.

Figure 4:
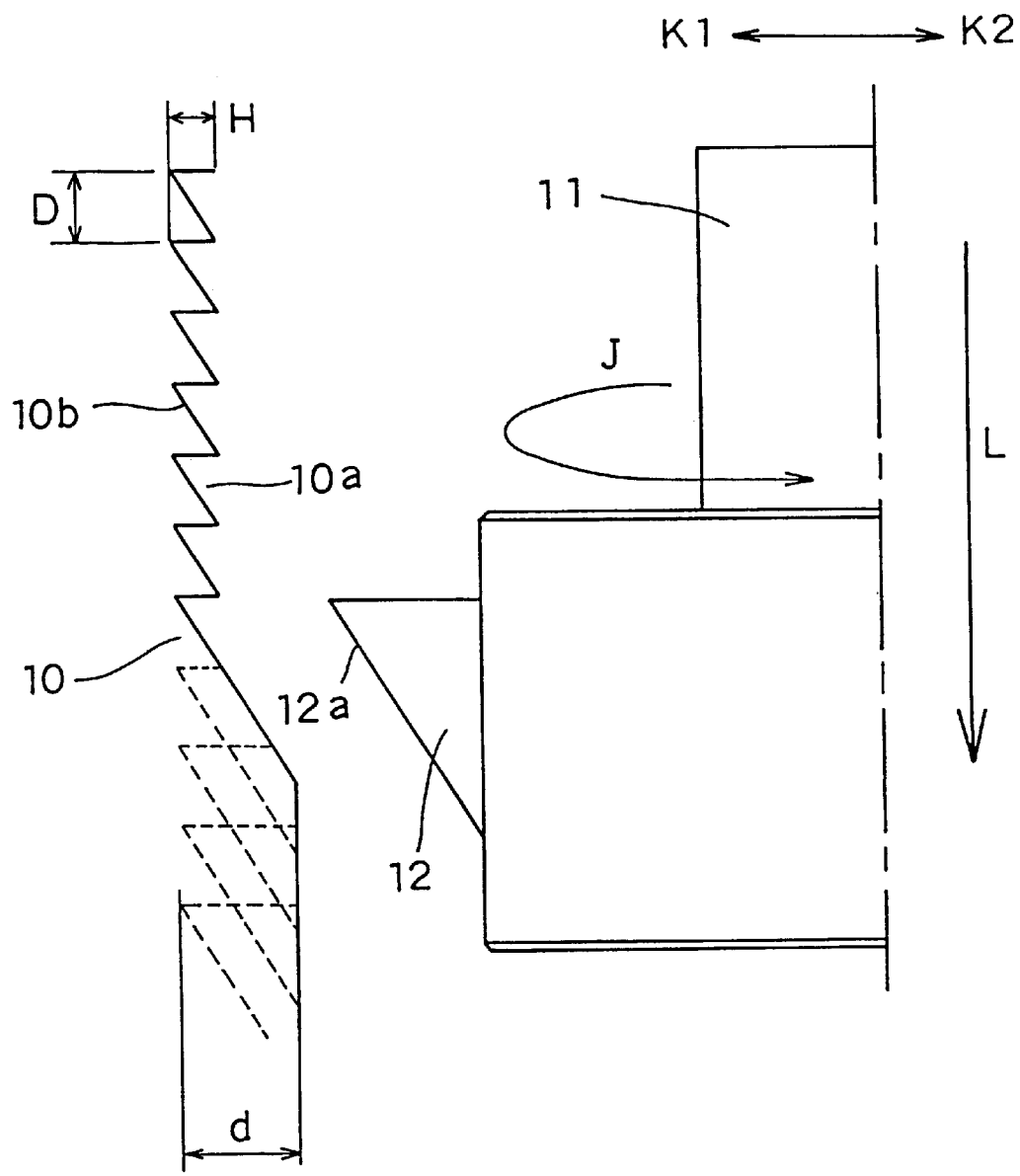
FIG. 4 is a diagram showing how a metal mold for molding the diffraction grating of the projection-type display apparatus of the first embodiment is produced.

The diffraction grating 102, which has a pattern having a blaze-shaped section that recurs in the y-axis direction (the first direction), is formed by injection molding of glass or a resin. The metal mold used here is produced by a method as shown in FIG. 4. A tool 12 made of diamond is fitted to a shank 11 that rotates in the direction indicated as J, and is placed so as to face the metal mold 10. The shank 11 is movable in the directions indicated as K1, K2, and L. On the other hand, the work-table (not shown) that holds the metal mold 10 is movable straight in the direction (called the direction M) perpendicular to the plane of the figure.

With the work-table retracted in the direction M, the diamond tool 12 is moved in the direction K1 until it is stopped when it has reached a predetermined depth d with respect to the molding metal 10. Then, the work-table is moved in the direction M so that the diamond tool 12 actually cuts the metal mold 10 in such a way as to form a V-shaped groove 10a in the metal mold 10 in the direction of the width thereof (in the direction perpendicular to the plane of the figure). When the metal mold 10 has been moved past the diamond tool 12, the diamond tool 12 is retracted in the direction K2, and is then fed in the direction L by a predetermined recurrence pitch D.

The diamond tool 12 is then moved in the direction K1 again until it is stopped when it has reached the predetermined depth d with respect to the molding metal 10. Then, the metal mold 10 is moved in the direction M, but backward this time as compared to when it was moved last time, so that a groove 10a is formed. These movements are repeated until a predetermined number of V-shaped grooves 10a are formed, and in this way a blaze shape that recurs with a pitch D is formed.

On the inclined surfaces 10b of the V-shaped grooves 10a, the minute irregularities on the cutting surface 12a of the diamond tool 12 leave grinding steaks that extend in the direction M. Accordingly, in the injection molding process, those grinding streaks are transferred onto the effective surfaces 102a (see FIG. 3) of the diffraction grating 102, and thus, in those surfaces, minutes grooves are formed that extend in the z-axis direction (the second direction). This causes a force that tends to align the length direction of the molecules of the optically anisotropic material such as liquid crystal with the grooves, and thereby the molecules of the optically anisotropic material are oriented uniaxially.

In FIG. 3, the counter flat plate 105 is made of a resin film. On that surface of the counter flat plate 105 which faces the birefringent optical material layer 103, an orientation film 105a made of polyimide or the like is laid that permits the optically anisotropic material to be oriented uniaxially. If the counter flat plate 105 is made of glass, which has a thermal expansion coefficient greatly different from that of the diffraction grating 102 that is made of a resin, a rise in temperature develops distortion in the liquid crystal cell, which may lead to destruction thereof. For this reason, the counter flat plate 105 needs to be made of a resin that has a thermal expansion coefficient close to that of the diffraction grating 102. It is preferable that the difference between the thermal expansion coefficients of the counter flat plate 105 and of the diffraction grating 102 be held below $2 \times 10^{-5}$/deg.

However, if the resin of which the counter flat plate 105 is made has birefringence, the polarization planes of the primary and secondary polarized light components 104a and 104b separated by the birefringent optical material layer 103 are disturbed thereby. This hinders the birefringent optical material layer 103 from functioning as a polarization separation device. For this reason, in this embodiment, to prevent disturbance of the polarization planes, the counter flat plate 105 is formed in the shape of a film. The resin film is made of a resin such as polyether sulfone, and is so formed as to have a thickness below 0.3 mm preferably. Alternatively, the counter flat plate 105 may be formed in the shape of a sheet or plate made of a resin having little birefringence such as PMMA or an acrylic resin.

The resin forming the diffraction grating 102 is so formed as to be comparatively thick. For this reason, if the diffraction grating 102 has birefringence, it is necessary to dispose, as in this embodiment, the diffraction grating 102 on the entrance side and the counter flat plate 105 on the exit side. This helps avoid the influence of the disturbance of the polarization planes by the diffraction grating 102.

Figure 5:
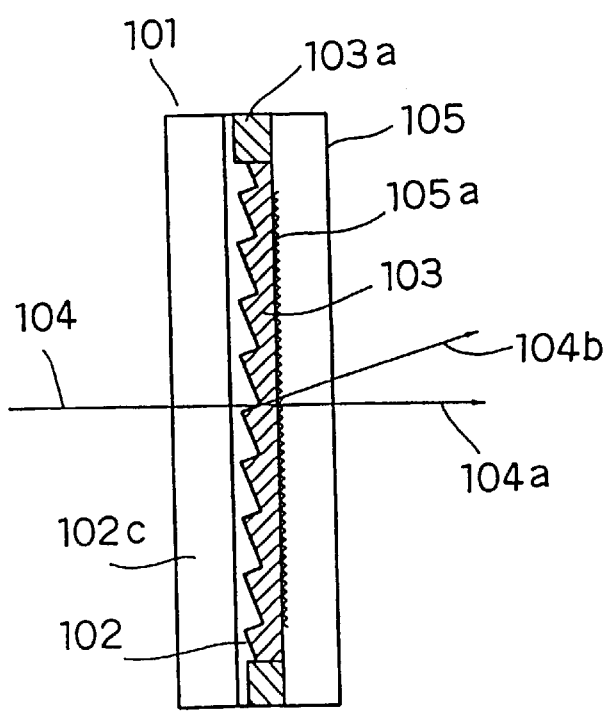
FIG. 5 is a diagram showing another example of the polarization separation device of the projection-type display apparatus of the first embodiment.

As shown in FIG. 5, it is also possible to attach a thin diffraction grating 102 on a base plate 102c made of glass or a resin having little birefringence. This makes it possible to dispose the diffraction grating 102 on the exit side and the counter flat plate 105 on the entrance side. In this case, if the diffraction grating 102 is made one-tenth or less as thick as the base plate 102c, it is possible to alleviate the influence of the thermal expansion of the resin and thereby obtain satisfactory reliability. Here, the counter flat plate 105 needs to be made of a material that has a thermal expansion coefficient approximately equal to that of the base plate 102c and that has no birefringence.

Assume that the birefringent optical material layer 103 has a refractive index N1 with respect to linearly polarized light vibrating in the y-axis direction and a refractive index N2 with respect to linearly polarized light vibrating in the z-axis direction, and that N1<N2. In this embodiment, the refractive index N0 of the material of the diffraction grating 102 and one N1 of the refractive indices of the birefringent optical material layer 103 are made substantially equal to each other such that |N0−N1|≦0.03. This permits the diffraction grating 102 to be regarded as non-existent with respect to the primary polarized light component 104a, and thus the primary polarized light component 104a is transmitted intact through the polarization separation device 101 and exits therefrom parallel to the incident light 104.

On the other hand, since N0<N2, the secondary polarized light component 104b exits from the polarization separation device 101 after being diffracted thereby. Here, the maximum height H of the diffraction grating 102 is so determined as to fulfill $$H = \lambda/(N2-N0). \tag{3}$$

This is a condition, derived from Equation (1) noted previously, that is to be fulfilled to permit the maximum phase difference that the diffraction grating gives with respect to light of a reference wavelength λ to be equal to 2π. Here, the reference wavelength λ is set, for example, at 550 nm as a wavelength representative of the wavelength range of visible light. In this embodiment, N2−N0=0.2, and hence H=2.75 μm.

Moreover, since the polarization separation device 101 is disposed in the vicinity of the light source 121, it is necessary to take into consideration the variation of the refractive indices due to a rise in temperature. Table 1 shows the variation of the diffractive indices of the individual materials due to variation in temperature. As this table clearly shows, in a case where a 25° C. temperature rise from normal temperature (25° C.) to 50° C. is expected, if any difference is secured between the refractive index N2 of the liquid crystal, which is an optically anisotropic material, and the refractive index N0 of the diffraction grating 102, which is made of a resin, it is preferable to set the difference (N2−N0) to be as great as $$(-6+70) \times 10^{-5} \times 25 = 0.016$$

at normal temperature.

With nematic liquid crystal, an extremely great rise in temperature causes phase transition from a nematic phase to an isotropic phase. Accordingly, if the transition temperature is assumed to be T0° C., it is possible to obtain satisfactory reliability by determining the use temperature T° C. as T<T0−20.

In this polarization separation device 101, the use of the diffraction grating 102 makes it possible to make the birefringent optical material layer 103 extremely thin. An angle of diffraction θ of about 10° is obtained when the pitch D and the maximum height H are of the order of several micrometers. Accordingly, it is easy to fill the microstructure portion of the diffraction grating 102 with liquid crystal molecules, liquid crystal monomers, liquid crystal polymers, or a uneasily organic material and then orient them uniaxially in a predetermined direction.

Figure 6:
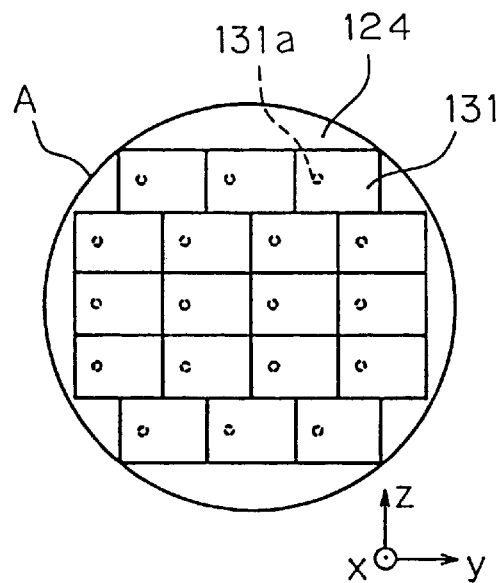
FIG. 6 is a diagram showing the first lens array of the projection-type display apparatus of the first embodiment.

The first lens array 124 has a structure as shown in FIG. 6. The rectangular coordinate system indicated in this figure is the same as that indicated in FIG. 2. The first lens array 124 has eighteen first lenses 131 arranged so as to lie inside the perfectly circular section A of the beam of light exiting from the parabolic surface mirror 122 (see FIG. 2). The individual first lenses 131 have their respective optical axis centers at appropriately decentered points as indicated by numeral 131a.

Figure 7:
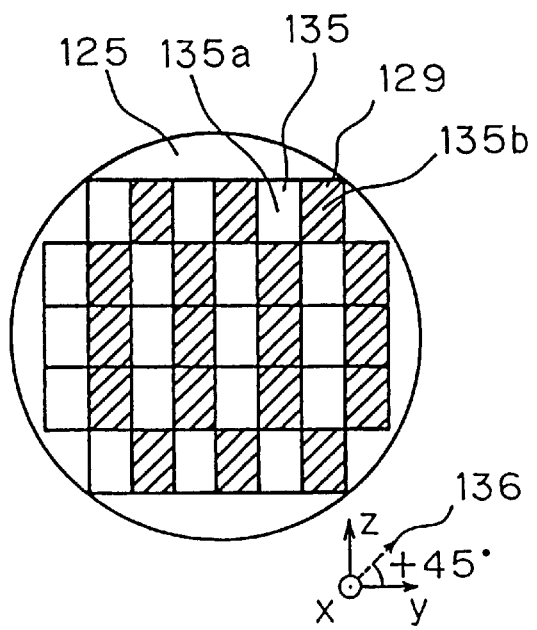
FIG. 7 is a diagram showing the second lens array of the projection-type display apparatus of the first embodiment.

The second lens array 125 has a structure as shown in FIG. 7. The rectangular coordinate system indicated in this figure is the same as that indicated in FIG. 2. The second lens array 125 has as many second lenses 135 as the first lenses 131 arranged in such a way as to correspond one to one to the first lenses 131. The individual second lenses 135 are so arranged that the apertures of the corresponding first lenses 131 are conjugate with the display areas of the reflection-type liquid crystal panels 130R, 130G, and 130B, and that the light beams having passed through the individual second lenses 135 are superimposed on each other on each of the reflection-type liquid crystal panels 130R, 130G, and 130B.

The second lenses 135 each have a phase difference plate 139 attached thereto so as to cover about half of their respective area. The phase difference plates 139 rotate the polarization plane of the light incident thereon through about 90°. These phase difference plates 139 are of a λ/2 type with respect to the wavelength representative of the light passing therethrough, and their optical axes are aligned with an appropriate direction. In this embodiment, the optical axis direction of the phase difference plates 139 is aligned with a direction 136 that makes an angle of 45° with the y axis on the y-z plane.

In each of the second lenses 135, the area where no phase difference plate is attached is the aperture area for the primary polarized light component 104a, and has its center of mass at a point as indicated by numeral 135a; the area where the phase difference plate 139 is attached is the aperture area for the secondary polarized light component 104b, and has its center of mass at a point as indicated by numeral 135b.

Of the incident light 104, which is naturally polarized light emitted from the light source 121, the primary polarized light component 104a travels straight through the polarization separation device 101, and the secondary polarized light component 104b is diffracted so as to travel in a direction a predetermined angle of diffraction θ apart from the primary polarized light component 104a in the y-axis direction. Then, the primary and secondary polarized light components are, by the first lens array 124, made to converge on the second lens array 125 as indicated by numerals 104a' and 104b' (see FIG. 2).

The light that has been made to converge by the first lens array 124 forms discrete illuminated spots on the apertures of the second lens array 125. The polarization plane of the secondary polarized light component 104b' is rotated through 90° by the phase difference plates 139 that are attached selectively to the areas through which this polarized light component passes, and thereby the polarization planes of the primary and secondary polarized light components are made identical.

It is preferable to determine the optical axis centers 131a of the first lenses 131 in such a way that the primary polarized light component 104a' converges in the vicinity of the above-mentioned centers of mass 135a of the second lenses 135. Then, the second polarized light component 104b' that has been made to converge by the first lens array 124 passes through the apertures of the second lenses 135 in positions thereon a predetermined distance deviated in the y-axis direction. By appropriately setting the angle of diffraction θ, it is possible to make the convergent secondary polarized light component 104b' pass through the second lenses 135 in the vicinity of the above-mentioned centers of mass 135b thereof.

The primary and secondary polarized light components 104a' and 104b' having passed through the second lens array 125 then exit from the polarization conversion optical system 120 and then strike the dichroic mirror 137 (see FIG. 1) as described previously.

In this projection-type display apparatus constructed as described above, as will be clear from Equation (3) noted previously, the greater the difference N2−N0 between the refractive indices, the smaller the maximum height H of the diffraction grating 102 can be made. As shown in FIGS. 8 and 9, provided that the angle α of the inclination of the non-effective surfaces 102b of the diffraction grating 102 is kept identical, by making the maximum height H smaller, it is possible to reduce the proportion of the incident light 104 that strikes the non-effective surfaces 102b of the diffraction grating 102.

Accordingly, if the refractive indices are so selected as to fulfill N2−N0≧0.1, the maximum height H is sufficiently small, and thus it is possible to reduce the proportion of the incident light 104 that strikes the non-effective surfaces 102b and thereby enhance diffraction efficiency. Normally, the value of N2−N0 is roughly 0.3 or smaller. In particular, it is preferable to fulfill N2−N0≧0.2, because then the maximum height H is 2.75 μm or smaller at a design wavelength λ of 550 nm, and thus it is possible to increase diffraction enhance greatly.

The smaller the recurrence pitch D of the blaze shape of the diffraction grating 102, the greater the proportion of the amount of light that strikes the non-effective surfaces 102b. This lowers diffraction efficiency. The angle of diffraction θ is given by Equation (2) noted previously that uses the recurrence pitch D. The greater the recurrence pitch D, the smaller the angle of separation (the angle of diffraction θ) between the primary and secondary polarized light components 104a and 104b.

Accordingly, to permit the incident light to be separated precisely and thereby permit the phase difference plates 139 to receive the intended component of the incident light, the first and second lens arrays 124 and 125 need to be disposed farther apart from each other, and this makes the polarization conversion optical system 120 larger. Thus, if the recurrence pitch D of the blaze shape of the diffraction grating 102 is within a range from 5 to 15 μm, it is possible to make the polarization conversion optical system 120 compact and simultaneously obtain high diffraction efficiency. Moreover, it is also easy to produce the metal mold.

Furthermore, by keeping the ratio of the maximum height H to the pitch D in a range H/D<0.5, it is possible to further reduce the proportion of the incident light 104 that strikes the non-effective surfaces 102b. This is preferable because higher diffraction efficiency can be obtained.

Moreover, it is preferable that the Abbe number $vd_2$ of the birefringent optical material layer 103 with respect to light vibrating in the z-axis direction be higher than 10. A lower Abbe number will make the difference between its refractive index and that of the diffraction grating 102 greater in a short-wavelength range, and thus lowers diffraction efficiency.

Alternatively, the refractive indices are so selected that |N2−N0|≦0.03 and N0−N1≧0.2. In this case, the linearly polarized light component that travels straight through the polarization separation device 101 and the linearly polarized light component that is refracted thereby exit therefrom with polarization planes different by 90° than in the case described above. Also this serves to enhance diffraction efficiency just as in the case described above.

Figure 10:
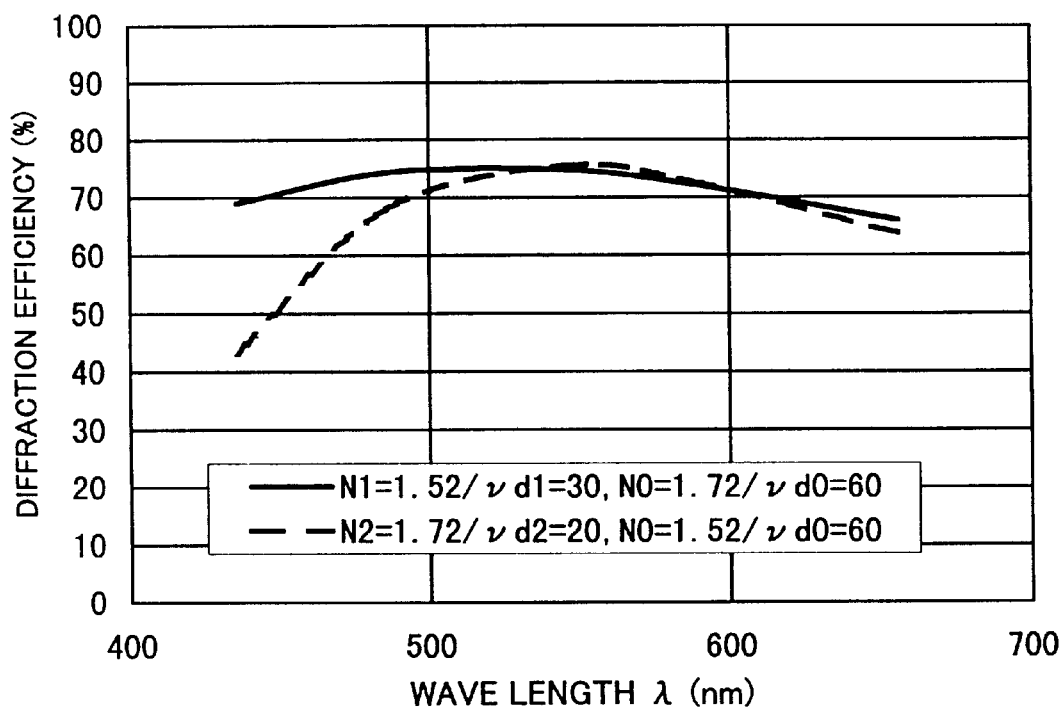
FIG. 10 is a diagram showing how the refractive index and Abbe number of the polarization separation device of the projection-type display apparatus of the first embodiment affects the diffraction efficiency obtained.
Figure 17:
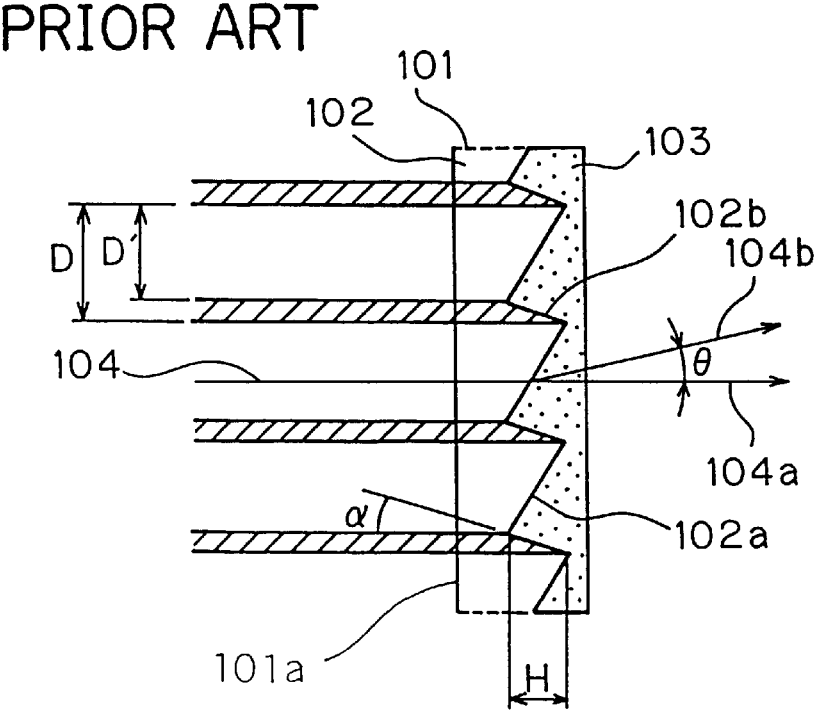
FIG. 17 is a diagram showing the problem associated with the polarization separation device of a conventional projection-type display apparatus.

Now, the conditions that permit high diffraction efficiency over the entire wavelength range will be described. FIG. 10 and Table 2 show the results of comparison testing that was conducted with the refractive index N0 of the diffraction grating made equal to each of the refractive indices N1 and N2 of the optically anisotropic material under the following conditions:

| | |
|---|---|
| Inclination angle α of non-effective surfaces (see FIG. 8) | 19.5° |
| Maximum height H of diffraction grating | 2.4 μm |
| Pitch D of diffraction grating | 8.5 μm |
| Length D' of effective surfaces (see FIG. 17) | 7.65 μm |
| Refractive index N0 of diffraction grating | 1.52, 1.72 |
| Abbe number $vd_0$ of diffraction grating | 60 |

-continued

| Refractive indices of optically anisotropic material | |
|---|---|
| (Vibration: y-axis direction) N1 | 1.52 |
| (Vibration: z-axis direction) N2 | 1.72 |
| Abbe numbers of the optically anisotropic material | |
| (Vibration: y-axis direction) $vd_1$ | 30 |
| (Vibration: z-axis direction) $vd_2$ | 20 |

As will be clear from FIG. 10 and Table 2, making the refractive index N0 of the diffraction grating equal to the refractive index N1 of the optically anisotropic material lowers diffraction efficiency in the short-wavelength range. The reason is as follows. The lower the wavelength, the higher the refractive index, and this tendency is stronger with a lower Abbe number.

As the above-noted conditions indicate, the Abbe number $vd_0$ of the diffraction grating 102 is made comparatively high, and the Abbe number $vd_2$ of the optically anisotropic material is made comparatively low. Thus, if the refractive index N0 of the diffraction grating 102 is made equal to the refractive index N1, i.e. the one having the lower value, of the optically anisotropic material, the difference between the refractive index N0 of the diffraction grating 102 and the refractive index N2 of the optically anisotropic material is too great in the shorter-wavelength range.

As a result, with the wavelength short and the difference (N2–N0) between the refractive indices great, the maximum height that is most appropriate in the short-wavelength range is too small as given by Equation (3) noted previously. Accordingly, the maximum height that is most appropriate in the short-wavelength range differs greatly from the design height (the maximum height H of the diffraction grating 102 formed so as to offer optimum characteristics at the design wavelength λ), and this lowers diffraction efficiency.

By contrast, if the refractive index N0 of the diffraction grating 102 is made equal to the refractive index N2, i.e. the one having the higher value, of the optically anisotropic material, the Abbe number $vd_0$ of the diffraction grating is comparatively high, and the Abbe number $vd_1$ of the optically anisotropic material is comparatively low, and thus the difference between the refractive index N0 of the diffraction grating 102 and the refractive index N1 of the optically anisotropic material is small in the short-wavelength range. As a result, with both the wavelength and the difference between the refractive indices great, the maximum height of the diffraction grating 102 that is most appropriate in the short-wavelength range does not differ so much from the design height, and this helps maintain high diffraction efficiency over the entire wavelength range.

In this case, by using nematic liquid crystal as the optically anisotropic material and designing in such a way that the refractive index N1 is 1.48 to 1.55, the Abbe number $vd_1$ is 40 or lower, the refractive index N2 is 1.65 or higher, and the Abbe number $vd_0$ of the diffraction grating 102 is 50 or higher, it is possible to minimize the lowering of the diffraction efficiency of the diffracted light (104b) and enhance the transmission efficiency of the straight-traveling light (104a).

Figure 11:
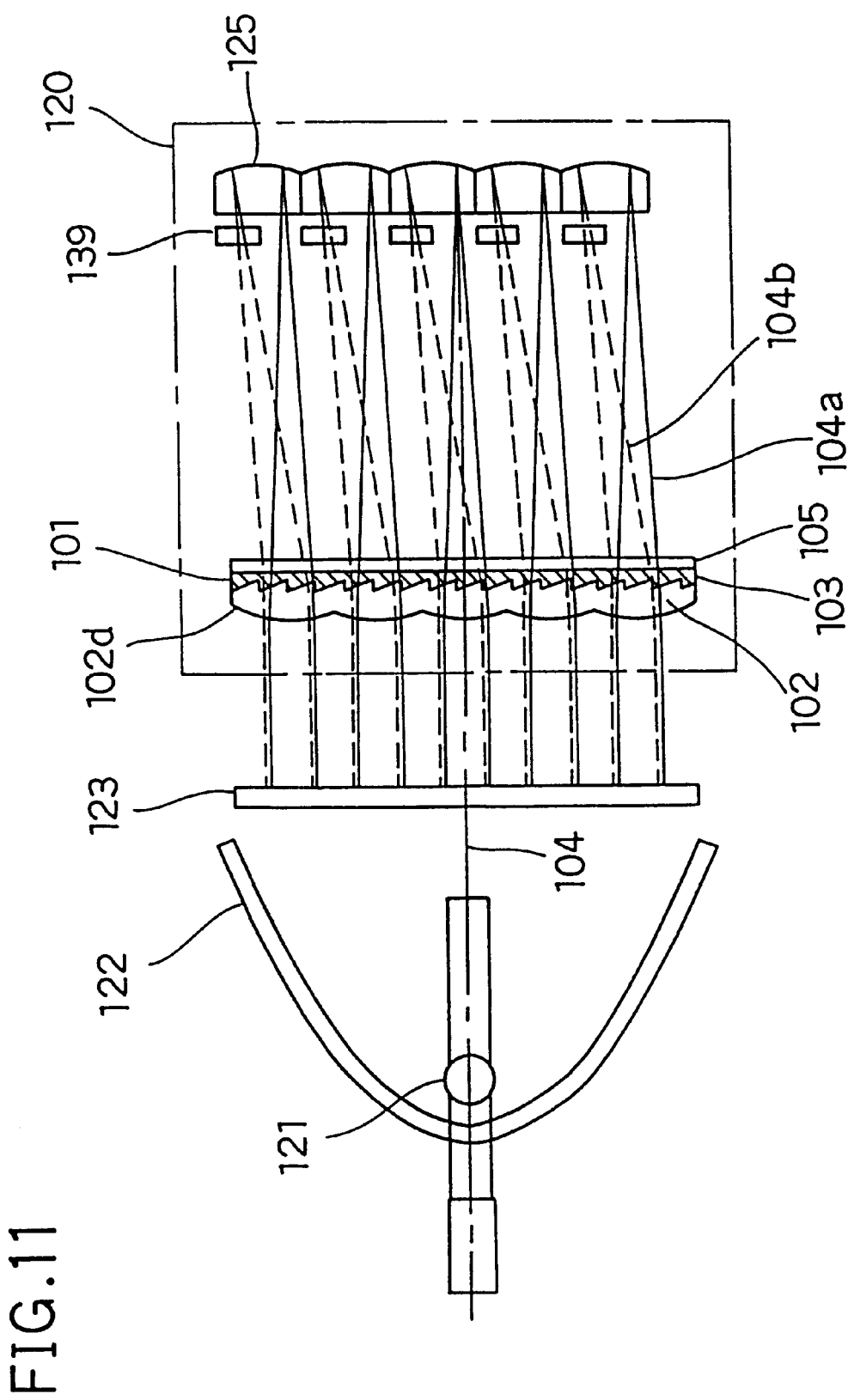
FIG. 11 is a diagram showing the construction of the polarization conversion optical system of the projection-type display apparatus of a second embodiment of the invention.

FIG. 11 is a diagram showing the construction of the polarization conversion optical system 120 of the projection-type display apparatus of a second embodiment of the present invention. Here, such components as are found also in the first embodiment are identified with the same reference numerals. The polarization conversion optical system of this embodiment is different from that of the first embodiment in that the diffraction grating 102 and the first lens array 124 (see FIG. 2) are formed integrally and thus the diffraction grating 102 has the lens array surface 102d provided on its own surface. In other respects, this embodiment is the same as the first embodiment.

In this embodiment, the diffraction grating 102 having a lens array surface 102d composed of a plurality of lens surfaces arranged in an array is formed by resin molding. This makes production of both a complex blaze shape and the lens array surface 102d easy, and also helps reduce the number of components needed. Moreover, whereas conventionally AR coating needs to be applied to both surfaces of the polarization separation device 101 and also to both surfaces of the first lens array 124, here AR coating needs to be applied to both surface of the polarization separation device 101 alone. This helps reduce production steps and thereby reduce the overall costs.

Here, by arranging the lens array surface 102d on the entrance side, even if the diffraction gating 102 has birefringence, incident light is first transmitted through the diffraction grating 102 and is then separated into two linearly polarized light components. This helps secure satisfactory polarization separation efficiency. As the material of the resin here, it is preferable to injection-mold a polyamide resin such as those having chemical formulae (I) and (II) as shown in FIGS. 19 and 20 described previously, because they are resistant to dissolution in nematic liquid crystal and are thus reliable.

Figure 12:
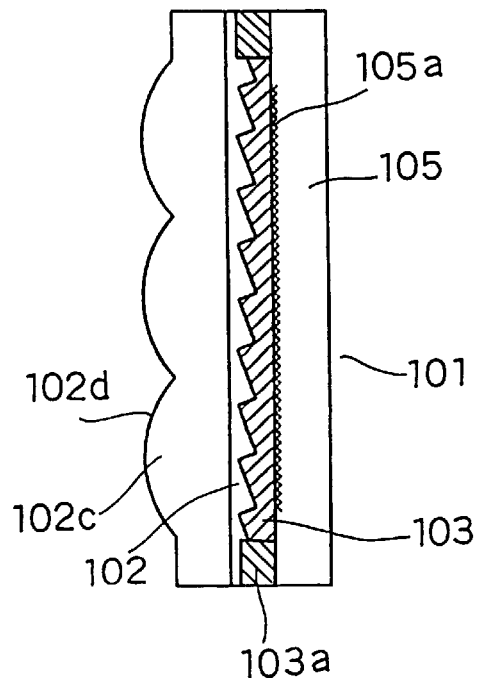
FIG. 12 is a diagram showing another example of the polarization separation device of the projection-type display apparatus of the second embodiment.
Figure 13:
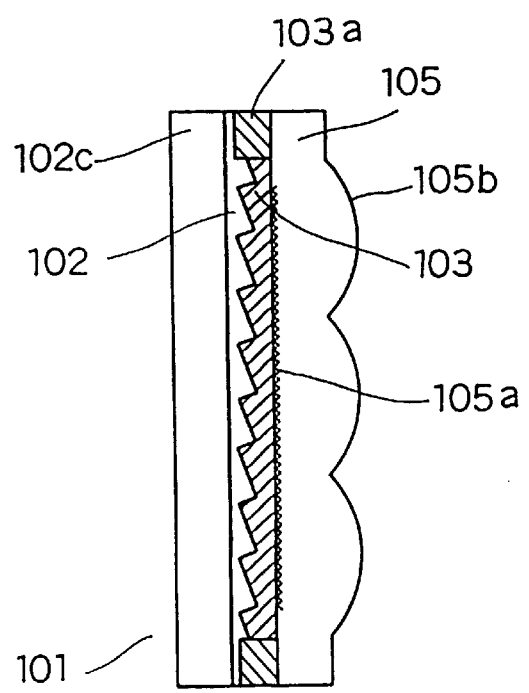
FIG. 13 is a diagram showing another example of the polarization separation device of the projection-type display apparatus of the second embodiment.
Figure 14:
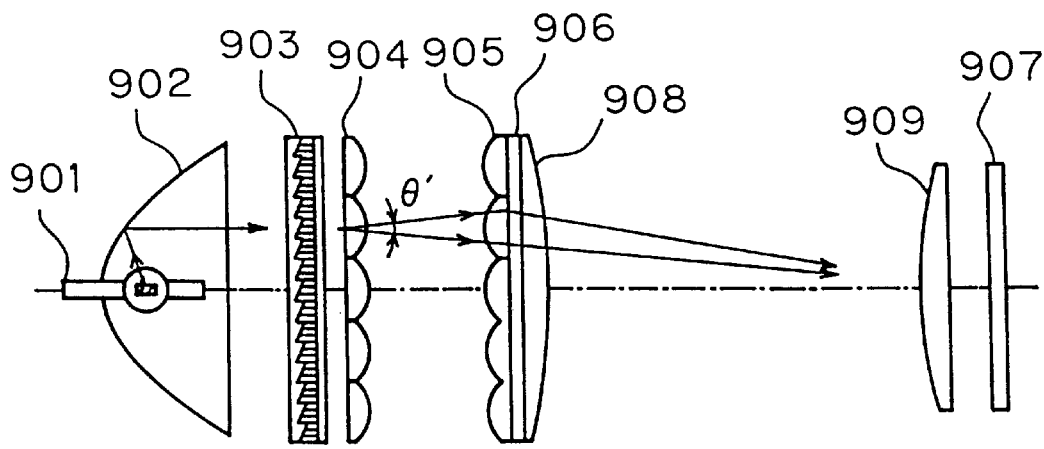
FIG. 14 is a diagram showing the construction of a conventional projection-type display apparatus.
Figure 15:
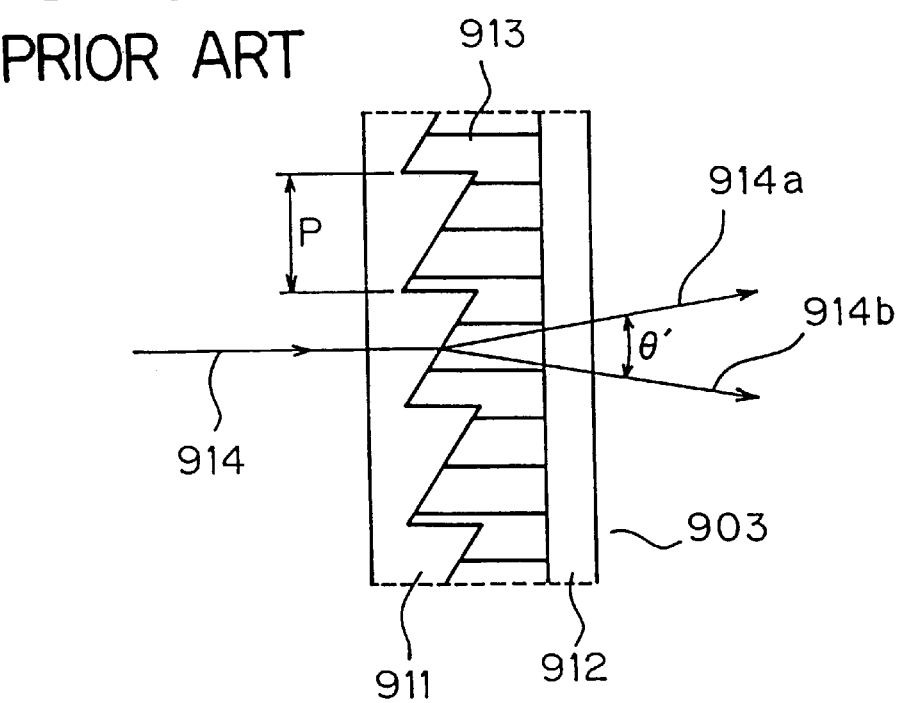
FIG. 15 is a diagram showing an example of the polarization separation device of a conventional projection-type display apparatus.
Figure 16:
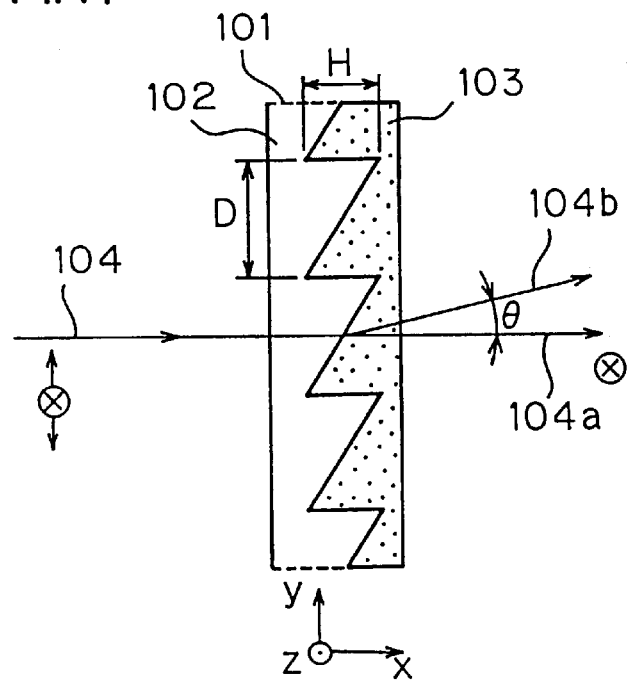
FIG. 16 is a diagram showing another example of the polarization separation device of a conventional projection-type display apparatus.

As shown in FIG. 12, just as in the case shown in FIG. 5, it is also possible to attach a thin diffraction grating 102 on a base plate 102c made of glass or a resin having little birefringence. The lens array surface 102d is formed on the base plate 102c. Alternatively, as shown in FIG. 13, it is also possible to form the counter flat plate 105 from glass or a resin having little birefringence and form a lens array surface 105a on the surface thereof. Also this serves the same purpose.

Although both the first and second embodiments described above deal with a projection-type display apparatus that employs three reflection-type liquid crystal panels, it is possible to achieve quite the same purpose by applying the present invention to a display apparatus of a single-panel type or one employing transmission-type liquid crystal panels.

TABLE 1

| | | Variation in Refractive Index $\times 10^{-5}/\deg$ |
|---|---|---|
| Resin | | −6 |
| Glass | | 0.5 |
| Liquid Crystal | N1 | −15 |
| | N2 | −70 |

TABLE 2

| | Optically Anisotropic Material | | Diffraction Grating | | Wavelength | | | | |
|---|---|---|---|---|---|---|---|---|---|
| | N | vd | NO | vd$_0$ | 436 | 486 | 546 | 588 | 656 |
| Diffraction Efficiency % | N1 = 1.52 | vd$_1$ = 30 | 1.72 | 60 | 68.9 | 74.3 | 74.7 | 72.2 | 66.0 |
| | N2 = 1.72 | vd$_2$ = 20 | 1.52 | 60 | 43.2 | 67.9 | 75.4 | 72.6 | 63.7 |

What is claimed is:

1. A polarization separation device comprising:
 a grating having a recurring blaze-shaped grating pattern formed on one surface of a transparent base plate; and
 an optically anisotropic material layer arranged adjacent to the grating and having different refractive indices in a direction in which the grating pattern recurs and in a direction perpendicular to that direction,
 wherein the polarization separation device separates light incident thereon into two linearly polarized light components that have polarization planes perpendicular to each other in accordance with polarization directions thereof by refracting one and simply transmitting the other of those two linearly polarized light components,
 wherein the following conditions are fulfilled:

$|Ne-N0| \geq 0.2$, and $|Np-N0| \leq 0.03$, where N0 represents a refractive index of the grating, Ne represents the refractive index of the optically anisotropic material layer with respect to one of the linearly polarized light components, and Np represents the refractive index of the optically anisotropic material layer with respect to the other of the linearly polarized light components.

2. A polarization separation device as claimed in claim 1, wherein the optically anisotropic material layer is made of nematic liquid crystal.

3. A polarization separation device as claimed in claim 1, wherein the following condition is fulfilled:

$0.1 \leq |Ne-Np| \leq 0.3$ where Ne represents the refractive index of the optically anisotropic material layer with respect to one of the linearly polarized light components, and Np represents the refractive index of the optically anisotropic material layer with respect to the other of the linearly polarized light components.

4. A polarization separation device as claimed in claim 1, wherein the grating pattern recurs at intervals of 5 to 1.5 μm.

5. A polarization separation device comprising:
 a grating having a recurring blaze-shaped grating pattern formed on one surface of a transparent base plate;
 an optically anisotropic material layer arranged adjacent to the grating and having different refractive indices in a direction in which the grating pattern recurs and in a direction perpendicular to that direction; and
 a lens array layer having a plurality of lens surfaces and arranged on an entrance side or exit side of the polarization separation device,
 wherein the polarization separation device separates light incident thereon into two linearly polarized light components that have polarization planes perpendicular to each other in accordance with polarization directions thereof by refracting one and simply transmitting the other of those two linearly polarized light components.

6. A polarization separation device as claimed in claim 5, wherein the lens array layer is formed on the transparent base plate and on an entrance side of the optically anisotropic material layer.

7. A polarization separation device as claimed in claim 5, wherein the optically anisotropic material layer is made of nematic liquid crystal.

8. A polarization separation device as claimed in claim 5, wherein the following conditions are fulfilled:

$|Ne-N0| \geq 0.2$, and $|Np-N0| \leq 0.03$, where N0 represents a refractive index of the grating, Ne represents the refractive index of the optically anisotropic material layer with respect to one of the linearly polarized light components, and Np represents the refractive index of the optically anisotropic material layer with respect to the other of the linearly polarized light components.

9. A polarization separation device as claimed in claim 5, wherein the following condition is fulfilled:

$0.1 < |Ne-Np| \leq 0.3$, where Ne represents the refractive index of the optically anisotropic material layer with respect to one of the linearly polarized light components, and Np represents the refractive index of the optically anisotropic material layer with respect to the other of the linearly polarized light components.

10. A polarization separation device as claimed in claim 5, wherein the grating pattern recurs at intervals of 5 to 1.5 μm.

11. A polarization separation device comprising:
 a grating having a recurring blaze-shaped grating pattern formed on one surface of a transparent base plate; and
 an optically anisotropic material layer arranged adjacent to the grating and having different refractive indices in a direction in which the grating pattern recurs and in a direction perpendicular to that direction,
 wherein the polarization separation device separates light incident thereon into two linearly polarized light components that have polarization planes perpendicular to each other in accordance with polarization directions thereof by refracting one and simply transmitting the other of those two linearly polarized light components, wherein the grating has minute grooves formed on a surface thereof facing the optically anisotropic material layer along one of the two directions.

12. A polarization separation device as claimed in claim 11,
wherein the minute grooves are grinding streaks formed in a metal mold with which the grating is molded.

13. A polarization separation device as claimed in claim 11,
wherein the optically anisotropic material layer is made of nematic liquid crystal.

14. A polarization separation device as claimed in claim 11,
wherein the following conditions are fulfilled:

$$|Ne-N0|\geq 0.2,$$

and $$|Np-N0|\leq 0.03,$$

where $N0$ represents a refractive index of the grating, $Ne$ represents the refractive index of the optically anisotropic material layer with respect to one of the linearly polarized light components, and $Np$ represents the refractive index of the optically anisotropic material layer with respect to the other of the linearly polarized light components.

15. A polarization separation device as claimed in claim 11,
wherein the following condition is fulfilled:

$$0.1 \leq |Ne-Np| \leq 0.3$$

where $Ne$ represents the refractive index of the optically anisotropic material layer with respect to one of the linearly polarized light components, and $Np$ represents the refractive index of the optically anisotropic material layer with respect to the other of the linearly polarized light components.

16. A polarization separation device as claimed in claim 11,
wherein the grating pattern recurs at intervals of 5 to 1.5 μm.

17. A projection-type display apparatus comprising:
a polarization separation device for separating light incident thereon into two linearly polarized light components that have polarization planes perpendicular to each other in accordance with polarization directions thereof by refracting one and simply transmitting the other of those two linearly polarized light components, comprising:
  a grating having a recurring blaze-shaped grating pattern formed on one surface of a transparent base plate; and
  an optically anisotropic material layer arranged adjacent to the grating and having different refractive indices in a direction in which the grating pattern recurs and in a direction perpendicular to that direction;
a light source for emitting light;
a light condenser for condensing the light emitted from the light source so as to form it into a substantially parallel beam;
a first lens array having a plurality of lenses;
a second lens array having a plurality of lenses arranged one for each of the lenses of the first lens array in such a way that the two linearly polarized light components exiting from the polarization separation device are made to converge on two different lenses of the second lens array;
a polarization plane rotator for rotating the polarization plane of one of the linearly polarized light components having passed through the second lens array so as to make it identical with the polarization plane of the other of the linearly polarized light components having passed through the second lens array;
a spatial light modulation device for modulating light having passed through the second lens array so as to form an optical image; and
a projection optical system for projecting the optical image,
wherein the following conditions are fulfilled:

$$|Ne-N0|\geq 0.2,$$

and $$|Np-N0|\leq 0.03,$$

where $N0$ represents a refractive index of the grating, $Ne$ represents the refractive index of the optically anisotropic material layer with respect to one of the linearly polarized light components, and $Np$ represents the refractive index of the optically anisotropic material layer with respect to the other of the linearly polarized light components.

18. A projection-type display apparatus comprising:
a polarization separation device for separating light incident thereon into two linearly polarized light components that have polarization planes perpendicular to each other in accordance with polarization directions thereof by refracting one and simply transmitting the other of those two linearly polarized light components, comprising:
  a grating having a recurring blaze-shaped grating pattern formed on one surface of a transparent base plate;
  an optically anisotropic material layer arranged adjacent to the grating and having different refractive indices in a direction in which the grating pattern recurs and in a direction perpendicular to that direction; and
  a lens array layer having a plurality of lens surfaces and arranged on an entrance side or exit side of the polarization separation device;
a light source for emitting light;
a light condenser for condensing the light emitted from the light source so as to form it into a substantially parallel beam;
a first lens array having a plurality of lenses;
a second lens array having a plurality of lenses arranged one for each of the lenses of the first lens array in such a way that the two linearly polarized light components exiting from the polarization separation device are made to converge on two different lenses of the second lens array;
a polarization plane rotator for rotating the polarization plane of one of the linearly polarized light components having passed through the second lens array so as to make it identical with the polarization plane of the other of the linearly polarized light components having passed through the second lens array;

a spatial light modulation device for modulating light having passed through the second lens array so as to form an optical image; and a projection optical system for projecting the optical image.

19. A projection-type display apparatus comprising:

a polarization separation device for separating light incident thereon into two linearly polarized light components that have polarization planes perpendicular to each other in accordance with polarization directions thereof by refracting one and simply transmitting the other of those two linearly polarized light components, comprising:

a grating having a recurring blaze-shaped grating pattern formed on one surface of a transparent base plate; and an optically anisotropic material layer arranged adjacent to the grating and having different refractive indices in a direction in which the grating pattern recurs and in a direction perpendicular to that direction, wherein the grating has minute grooves formed on a surface thereof facing the optically anisotropic material layer along one of the two directions;

a light source for emitting light;

a light condenser for condensing the light emitted from the light source so as to form it into a substantially parallel beam;

a first lens array having a plurality of lenses;

a second lens array having a plurality of lenses arranged one for each of the lenses of the first lens array in such a way that the two linearly polarized light components exiting from the polarization separation device are made to converge on two different lenses of the second lens array;

a polarization plane rotator for rotating the polarization plane of one of the linearly polarized light components having passed through the second lens array so as to make it identical with the polarization plane of the other of the linearly polarized light components having passed through the second lens array;

a spatial light modulation device for modulating light having passed through the second lens array so as to form an optical image; and a projection optical system for projecting the optical image.

\* \* \* \* \*